(12) United States Patent
Hohlfeld et al.

(10) Patent No.: US 7,908,838 B2
(45) Date of Patent: Mar. 22, 2011

(54) AGRICULTURAL HARVESTING MACHINE WITH FRONT ATTACHMENT SUPPORT

(75) Inventors: Markus Hohlfeld, Rheine (DE); Bjoern Stremlau, Recke (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 12/566,050

(22) Filed: Sep. 24, 2009

(65) Prior Publication Data

US 2010/0077715 A1 Apr. 1, 2010

(30) Foreign Application Priority Data

Sep. 26, 2008 (DE) ........................ 10 2008 049 130

(51) Int. Cl.
 *A01B 73/00* (2006.01)
(52) U.S. Cl. ................................................. 56/228
(58) Field of Classification Search .................. 56/228, 56/208, 14.5, 10.2 E, DIG. 15; 172/311, 172/388, 452, 669, 275; 37/231, 234, 236; 280/481, 495; 180/89.13
See application file for complete search history.

(56) References Cited

U.S. PATENT DOCUMENTS

| | | | |
|---|---|---|---|
| 3,648,780 A * | 3/1972 | Fueslein et al. ............... 172/319 |
| 3,683,605 A * | 8/1972 | Jakobi ............................. 56/228 |
| 4,078,626 A * | 3/1978 | Weichel ......................... 111/131 |
| 4,193,250 A * | 3/1980 | Kessens et al. ................. 56/208 |
| 4,206,582 A * | 6/1980 | Molzahn et al. ............... 56/15.8 |
| 4,414,792 A * | 11/1983 | Bettencourt et al. ........ 56/10.2 E |
| 4,506,609 A * | 3/1985 | Fuss et al. ..................... 111/136 |
| 4,567,719 A * | 2/1986 | Soots et al. ..................... 56/364 |
| 5,562,167 A * | 10/1996 | Honey ............................ 172/386 |
| 5,704,200 A * | 1/1998 | Chmielewski et al. ..... 56/10.2 E |
| 5,867,970 A * | 2/1999 | Ehrhart et al. ..................... 56/6 |
| 5,967,540 A * | 10/1999 | Gallenberg ..................... 280/481 |
| 6,282,875 B1 | 9/2001 | Holtkotte et al. |
| 6,789,379 B2 * | 9/2004 | Heidjann et al. ........... 56/10.2 E |
| 6,813,873 B2 * | 11/2004 | Allworden et al. ......... 56/10.2 E |
| 6,843,046 B2 * | 1/2005 | Heidjann et al. ................ 56/208 |
| 7,003,938 B2 * | 2/2006 | Erdmann et al. ................ 56/228 |
| 7,165,384 B1 * | 1/2007 | Wubbels et al. ............... 56/15.6 |
| 7,222,480 B2 * | 5/2007 | Erdmann et al. ................ 56/228 |
| 2006/0150605 A1* | 7/2006 | Wubbels et al. ............... 56/15.8 |
| 2008/0047248 A1* | 2/2008 | Haffert et al. .................. 56/228 |
| 2010/0115906 A1* | 5/2010 | Tilly et al. ...................... 56/228 |

FOREIGN PATENT DOCUMENTS

| | | |
|---|---|---|
| DE | 199 18 551 | 10/2000 |
| DE | 10224861 A1 * | 12/2003 |
| EP | 1 261 247 | 12/2002 |

* cited by examiner

*Primary Examiner* — Árpád Fábián-Kovács
(74) *Attorney, Agent, or Firm* — Michael J. Striker

(57) ABSTRACT

A self-propelled agricultural harvesting machine includes an agricultural front attachment which is supported via at least one carrier wheel which is in contact with a ground, at least one height-adjustable pick-up housing for adapting the agricultural front attachment and a control device controlling a ground pressure of the at least one carrier wheel on the ground that results when the front attachment assumes a non-working position.

12 Claims, 3 Drawing Sheets

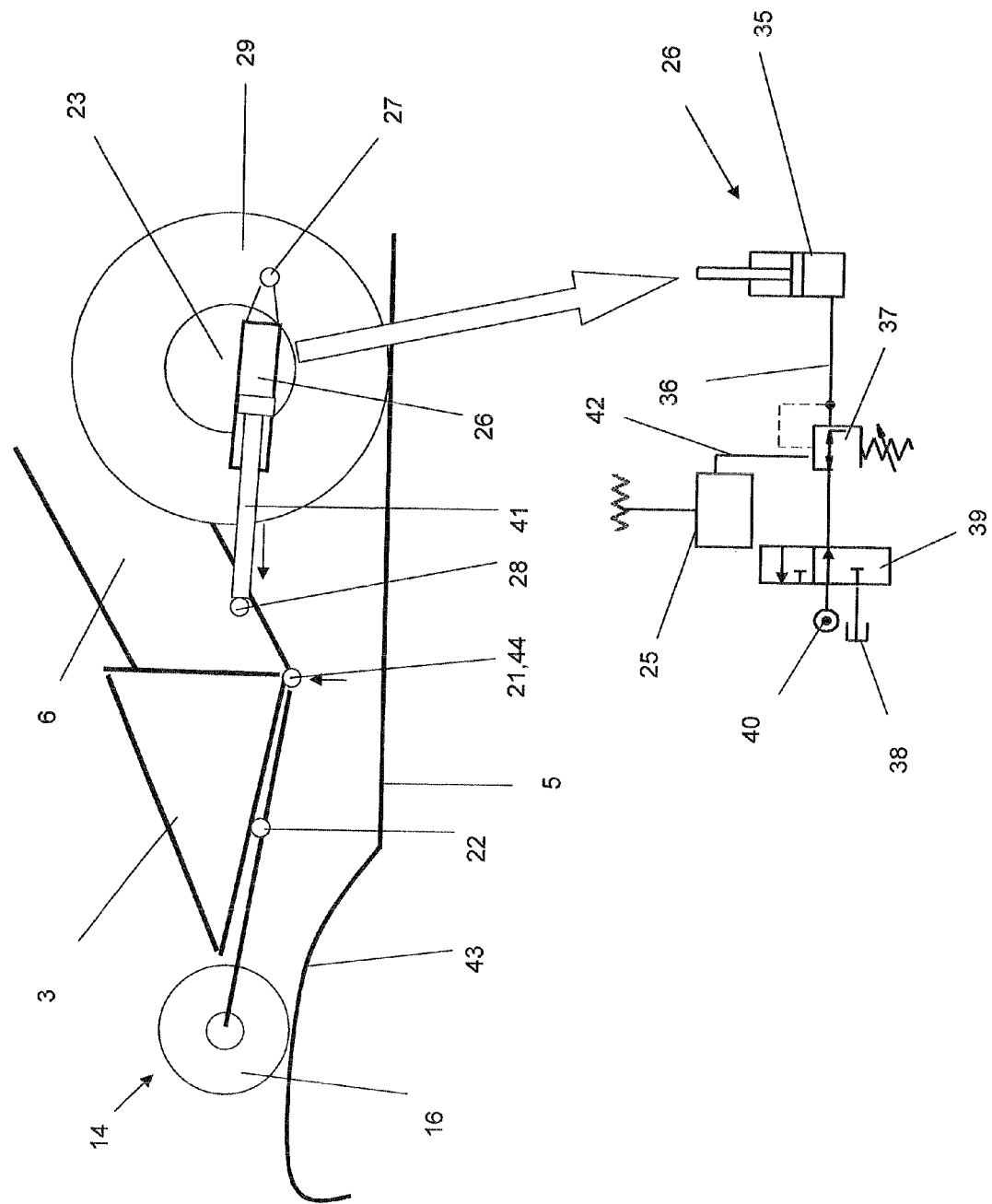

AGRICULTURAL HARVESTING MACHINE WITH FRONT ATTACHMENT SUPPORT

CROSS-REFERENCE TO RELATED APPLICATION

The invention described and claimed hereinbelow is also described in German Patent Application DE 10 2008 049 130.6 filed on Sep. 26, 2008. This German Patent Application, whose subject matter is incorporated here by reference, provides the basis for a claim of priority of invention under 35 U.S.C. 119(a)-(d).

BACKGROUND OF THE INVENTION

The present invention relates to a self-propelled agricultural harvesting machine that includes an installed front attachment which is supported when in a non-working position by at least one carrier wheel system which is in contact with the ground.

The output of agricultural harvesting machines continues to increase, thereby requiring the use of increasingly larger and heavier front attachments. Typically, headers of combine harvesters are detached from the combine harvester and placed on a trailer in order to be hauled on the road. In contrast, corn headers and corn pickers are typically not detached from forage harvesters in preparation for travel on the road; instead, they remain attached to the forage harvester. In preparation for travel on the road, these front attachments can be folded using different types of folding mechanisms, in order to decrease their width, as is the case with grain-cutting devices. However, the fact that the permissible axle load, in particular on the drive axle of agricultural harvesting machines, is stipulated by various standards poses a problem given that the front attachments are becoming increasingly wider and heavier.

DE 199 18 551 makes known an agricultural harvesting machine designed as a forage harvester that includes an intermediate attachment on the front side that accommodates an agricultural working device. To ensure that the load of the agricultural working device need not be supported exclusively by the carrier vehicle axle situated at the front relative to the direction of travel, it is provided in at least one embodiment that carrier wheels are assigned to the intermediate attachment that make it possible for at least a portion of the mass of the agricultural working device to be supported on the ground via these carrier wheels during travel on the road. However, in order to adapt the carrier wheels to the intermediate attachment of the agricultural harvesting machine, this intermediate attachment must be stiffened considerably since extreme impact loads may occur when traveling over uneven ground, and these impact loads must be absorbed by the intermediate attachment. Given that the axles of the carrier wheels are located directly on the intermediate attachment of the agricultural harvesting machine, the carrier wheels are unable to move vertically relative to this intermediate attachment. As a result, when the intermediate attachment is lifted, the load that is transferred from the carrier wheels to the ground decreases gradually and reaches zero in the instant at which the carrier wheels have lost their contact with the ground. At this instant, the carrier wheels are no longer performing a support function, and the entire load acts on the front axles of the harvesting machine.

EP 1 261 247 B1 describes a device for use with front attachments of self-propelled combine harvesters that follows the ground contour and is designed to react quickly and exactly to uneven ground surfaces by displacing the front attachment vertically and transversely. This object is attained using different electro-hydraulic connections between the control and operating elements that needed in order to follow the ground contour. Although this results in an efficient method of following the ground contour, the weight of the front attachment and the feed rake is introduced directly into the front axle of the combine harvester; the load is not distributed, which is an important requirement in the case of wide, heavy front attachments in particular. The problem of load distribution that occurs when the front harvesting attachment has assumed the transport position is not solved.

SUMMARY OF THE INVENTION

The object of the present invention, therefore, is to avoid the disadvantages of the cited related art and to refine a harvesting machine of the type described initially such that an optimal mass distribution of the axle loads is ensured, in particular to prevent the stipulated axle loads from being exceeded when a heavy front attachment is being hauled.

In keeping with these objects and with others which will become apparent hereinafter, one feature of the present invention resides, briefly stated, in a self-propelled agricultural harvesting machine, comprising an agricultural front attachment which is supported via at least one carrier wheel which is in contact with a ground; at least one height-adjustable pick-up device for adapting said agricultural front attachment; and a control device controlling a ground pressure of said at least one carrier wheel on the ground that results when said front attachment assumes a non-working position.

Given that the ground pressure of the at least one carrier wheel situated on the front attachment is controlled using an automatic ground pressure control device when the front attachment assumes a non-working position, it is ensured, in particular when heavy front attachments must be transported by the harvesting machine, that a definable component of the load of the front attachment is absorbed by the carrier wheel in order to relieve the load on the drive axle and/or the steering axle, thereby ensuring compliance with the stipulations on axle loads.

In an advantageous development of the present invention, the pick-up device is designed to be displaceable vertically using at least one lifting cylinder, it being possible to regulate the ground pressure of the at least one carrier wheel on the ground by applying pressure to or releasing pressure from the at least one hydraulic cylinder situated on the pick-up device, thereby making it possible to regulate the ground pressure of the at least one carrier wheel without the use of additional hydraulic cylinders and, therefore, in a less cost-intensive manner; as such, the permissible axle loads on the harvesting machine that occur when a heavy front attachment is hauled may be maintained.

In an advantageous embodiment of the present invention, the pressure value of the hydraulic cylinder is regulated constantly via the automatic ground pressure control device when the front attachment has assumed a transport position, thereby making it possible to attain a constant axle load on the drive axle and/or steering axle of the harvesting machine during transport travel.

To ensure that the load component to be supported by the drive axle and/or steering axle of the agricultural harvesting machine always corresponds to the load components stipulated by various standards, it is possible in a further advantageous development of the present invention for the pressure value of the at least one hydraulic cylinder located on the pick-up device to be selected as a function of the load components of the drive axle and/or the steering axle.

In a further advantageous embodiment of the present invention, the pressure value of the at least one hydraulic cylinder mounted on the pick-up device is regulated as a function of the type of pick-up device installed, thereby enabling the pressure control to be adapted to the particular front attachment installed, and to its weight, thereby making it easier—for an inexperienced operator in particular—to comply with the stipulations on axle loads.

In the simplest case, the automatic ground pressure control device which is used to control the pressure of the at least one hydraulic cylinder of the pick-up device is designed as a pressure-control valve and/or a pressure-limiting valve, it being possible to control the pressure by specifying a threshold pressure value. It is also within the scope of the present invention to use an electronic ground pressure control device in order to attain automatic ground pressure control.

In order to obtain information about the current axle loads, on the drive axle of the harvesting machine in particular, the pressure in the lifting cylinder located on the pick-up device may be used as an indicator for determining the axle load on the drive axle and/or steering axle of the harvesting machine. Preferably, the drive axle and/or the steering axle of the harvesting machine are/is equipped with at least one load-sensing sensor which transmits load-dependent signals to a control and evaluation unit in which a control signal is generated; the control signal controls the pressure of the lifting cylinder situated on the pick-up device in order to adjust the support load of the at least one carrier wheel. Preferably, a display unit is provided for displaying the selected pressure value and the actual pressure value, thereby ensuring that the operator is constantly informed about the pressure control.

In a further advantageous development of the present invention, if a definable setpoint axle load of the drive axle and/or steering axle is fallen below or exceeded, an acoustic and/or optical warning message is emitted, thereby informing the operator of the harvesting machine that the pressure value he specified for the pressure in at least one lifting cylinder does not result in the required distribution of axle load when the front attachment was moved into a transport position, or informing him that an automatic ground pressure control system is malfunctioning. The warning message is preferably displayed in a display unit located in the driver's cab, so that the driver may implement the necessary remedy immediately.

If the installed front attachment to be transported is relatively wide and heavy, it has proven advantageous for the at least one carrier wheel to be mounted on a carriage which may be slid under the front attachment and/or the harvesting machine and locked in position there, thereby ensuring that a larger contact area exists against which the front attachment may be placed. In a specific embodiment, the carriage includes a frame structure and at least one downwardly extending carrier wheel; the frame structure for supporting the front attachment and relieving weight from the front axle and/or steering axle of the harvesting machine during transport travel is detachably fastened to the front attachment mounted on the harvesting machine, and it may be separated from the front attachment for harvesting operation. In the attached state, the carriage advantageously assumes a height-adjustable floating position, thereby ensuring that the ground pressure may be controlled constantly even when traveling over uneven ground, and thereby ensuring that the axle load distribution remains constant, since the carrier wheel is in permanent contact with the ground.

Further advantageous embodiments are the subject matter of further dependent claims and will be explained in greater detail below with reference to the drawing.

BRIEF DESCRIPTION OF THE DRAWINGS

FIG. 3 shows a second schematic illustration of a front attachment that has been placed on a carriage that is traveling over a bump, the illustration also showing the automatic ground pressure control device according to the present invention

DESCRIPTION OF THE PREFERRED EMBODIMENTS

Figure 1:
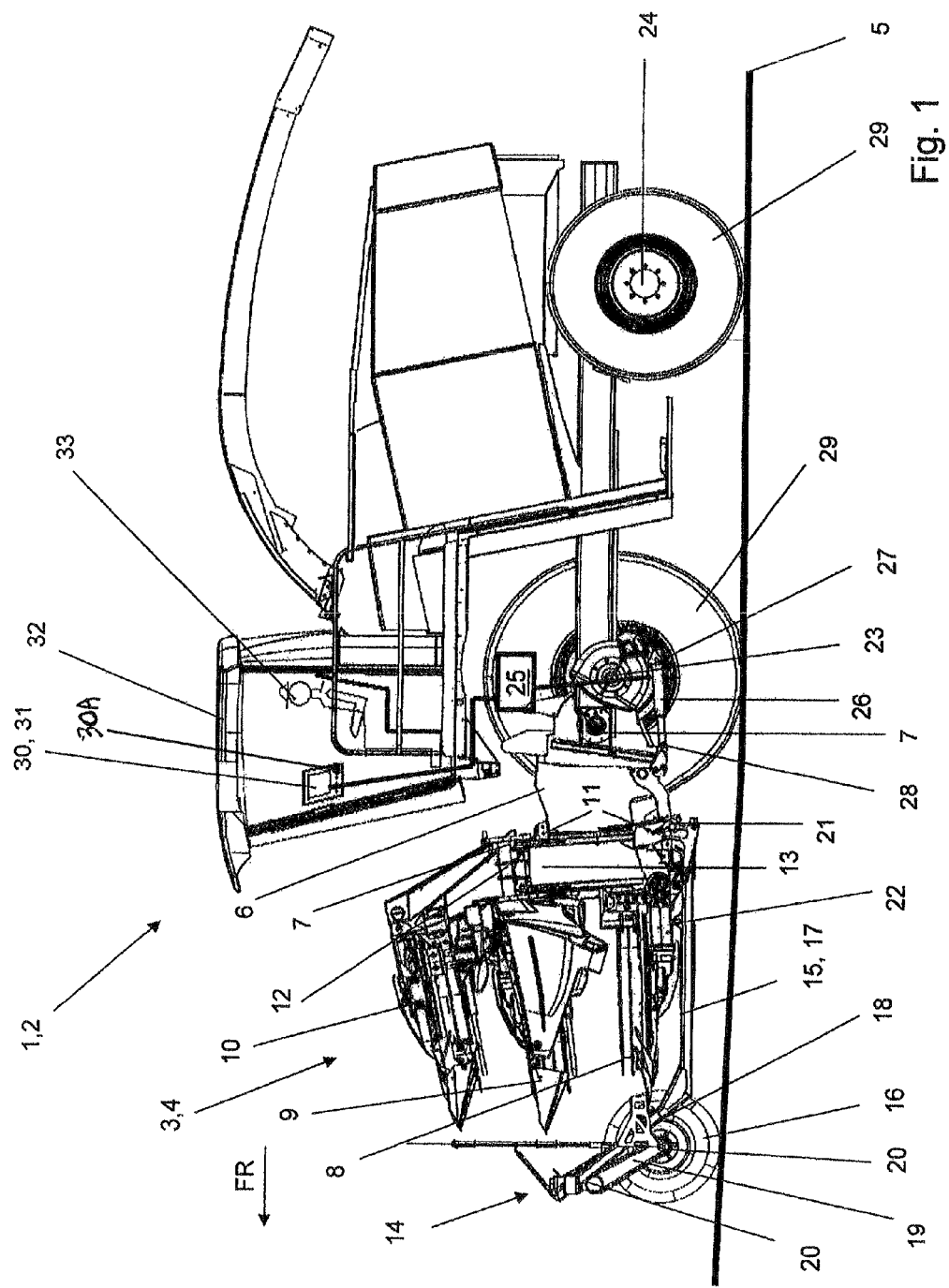
FIG. 1 shows a schematic depiction of an agricultural harvesting machine in the form of a forage harvester including an installed front attachment that has been placed on a carriage

FIG. 1 shows a side view of a self-propelled harvesting machine 1 which is designed as a forage harvester 2, to the front side—relative to direction of travel FR—of which a front attachment 3 designed as a corn header 4 is assigned. Front attachment 3 is used to pick up and cut the crop material from ground 5 so that it may be directed to the downstream working assemblies which are not depicted here. A pick-up device and/or a feeder housing 6 are/is located downstream of front attachment 3, it being possible for feeder housing 6 to be swiveled vertically relative to direction of travel FR about a pivot axis 7 in order to compensate for the longitudinal inclination.

Front attachment 3 is designed to be foldable, and it is composed of three sections 8, 9, 10; middle section 9 is connected via coupling points 11 to feeder housing 7 of forage harvester 2. Outer sections 8, 10 are connected to either side of middle section 9; outer sections 8, 10 are folded upward in swivel bearings 12 which bear against the back side of central machine frame 13 on bearing consoles (not depicted). The folded-upward position is also the transport position of front attachment 3. Using this foldable design, it is possible to realize working widths of up to approximately 9 meters, for instance. A carriage 14 which includes a frame structure 15 and a carrier wheel 16 which is situated in front and is in contact with ground 5 is used to support front attachment 3 while it is being transported. Carriage 14 may be removed before the harvesting operation is begun. Frame structure 15 is composed of two rearward support elements 17 which are situated laterally next to one another and extend nearly horizontally underneath front attachment 3. Upwardly slanted braces 18 extend on front—relative to direction of travel FR—end side of particular support element 17. Carrier wheel 16 is located on a rocker arm 19 which extends downward at a slight slant and is hingedly connected to top brace 18. Carrier wheel 16 is hingedly connected to rocker arm 19 such that it may rotate about its rotational axis 20. Front attachment 3 is attached to carriage 14 at a coupling point 21 in the end-side region of particular support element 17 which extends nearly horizontally. While front attachment 3, together with carriage 14, is fixed in coupling point 21, it may swivel vertically about a horizontal axis, and it assumes a floating position. In the state in which it is placed on carriage 14, center section 9 of folded front attachment 3 rests on support point 22 of carriage 15, so that a definable weight component of front attachment 3 is supported by carriage 14. Due to the floating position of carriage 14, carrier wheel 16—which is located ahead of front attachment 3—of carriage 14 may follow uneven ground contours, and it remains in contact with the ground at all times during transport travel.

To ensure that the axle load distribution on drive axle 23 and/or steering axle 24 does not change when traveling over uneven ground, i.e., when traveling over bumps or dips in the ground, it is provided according to the present invention that the ground pressure of the at least one carrier wheel 16 against ground 5 is controlled using an automatic ground pressure control device 25 when front attachment 3 is in a transport position and is supported on carriage 14. In the embodiment, the ground pressure control to be explained in greater detail with reference to FIGS. 2 and 3 takes place using lifting cylinders 26 situated on either side of feeder housing 6 of harvesting machine 1; pressure is applied to and released from lifting cylinders 26 to regulate the pressure with which carrier wheel 16 bears against ground 5. It would also be feasible for feeder housing 6 to be supported via only one lifting cylinder 26 or by any number of lifting cylinders 26. Lifting cylinders 26 are rotatably supported in the lower region of front drive axle 23 in a pivot point 27; the particular piston rod of lifting cylinders 26 is rotatably supported laterally in a pivot point 28 in the lower region of feeder housing 6. Lifting cylinders 26 are single-acting in design (not depicted), and they are operatively connected via a line 29 to automatic ground pressure control device 25. In the simplest case, in order to control lifting cylinders 26, a pressure-control valve which will be described in greater detail with reference to FIGS. 2 and 3 may be assigned to the lifting cylinders. Via the pressure-control valve, the pressure in lifting cylinders 26 may be controlled constantly by specifying a threshold pressure value, thereby making it possible via pressure control to limit the axle load transferred to drive axle 23 and/or steering axle 24 of agricultural harvesting machine 1 to a fixed value when a partial load of front attachment 3 to be transported and which is connected to carriage 14 is supported by carriage 14 during transport travel, thereby making it possible to attain a constant axle load distribution that conforms to the applicable standards.

To ensure that the load component to be supported by drive axle 23 and/or steering axle 24 of agricultural harvesting machine 1 always corresponds to the load components stipulated by various standards, at least one load-sensing sensor which is known per se and is not depicted here may be assigned to each axle 23, 24 of harvesting machine 1; the load-sensing sensor is designed, e.g., as a pressure sensor for determining the tire pressure of land wheels 29. The load-sensing sensors generate input signals (not depicted) as a function of the particular axle load. In a control and evaluation unit 30, the input signals generate an output signal as a function of a definable axle load distribution ratio. Via the output signal, pressure is applied to or released via a switching valve (not depicted) from the at least one lifting cylinder 26 situated on feeder housing 6. In addition, a load-sensing sensor (not depicted) may be assigned to the at least one carrier wheel 16. The load-sensing sensor generates an input signal that is a function of the axle load, and that may be used by a control and evaluation unit 30 as a measure of the pressure that is being exerted on ground 5 by the front attachment. In this manner, it is possible to also adjust the axle load distribution as a function of the support of the front attachment by carrier wheel 16 on ground 5. In order to obtain information about the current axle loads, on drive axle 23 of harvesting machine 1 in particular, the pressure in lifting cylinder 26 located on feeder housing 6 may be used as an indicator for determining the axle load on drive axle 23 and/or steering axle 24 of harvesting machine 1.

Preferably, a display unit 31 is provided for displaying the selected pressure value and the actual pressure value in driver's cab 32, thereby ensuring that operator 33 of harvesting machine 1 remains in control of the pressure regulation of the at least one lifting cylinder 26 situated on feeder housing 6. The display unit 31 emits an optical warning message if an axle load on drive axle 23 or steering axle 24 falls below or exceeds a definable setpoint. For that matter, an acoustic transducer 30A is included in control and evaluation unit 30 to emit an acoustic warning message if an axle load on drive axle 23 or steering axle 24 falls below or exceeds a definable setpoint.

According to a further advantageous development of the present invention, if the previously defined setpoint axle load of drive axle 23 and/or steering axle 24 is fallen below or exceeded, an acoustic and/or optical warning message is emitted, thereby informing operator 33 of harvesting machine 1 that the threshold pressure value he specified for the pressure system of the at least one lifting cylinder 26 does not result in the required distribution of axle load when the front attachment has been placed on carrier 14 for transport, or informing him that an automatic ground pressure control system is malfunctioning. The warning message is preferably displayed in a display unit 31 situated in driver's cab 32, so that operator 33 may implement the necessary remedy immediately.

In a further embodiment, it is provided that the pressure value in the pressure system of the at least one hydraulic cylinder 26 mounted on feeder housing 6 is regulated as a function of the type of front attachment 3 that is installed, thereby enabling the pressure control to be adapted to the particular front attachment 3 that is installed, and to its weight, thereby making it easier—for an inexperienced operator 33 in particular—to maintain the stipulated axle loads. It is feasible for detection devices known per se, such as a camera, to be used to detect the type of front attachment 3 that is installed, these detection devices being connected via appropriate lines (not depicted) to automatic ground pressure control device 25.

Figure 2:
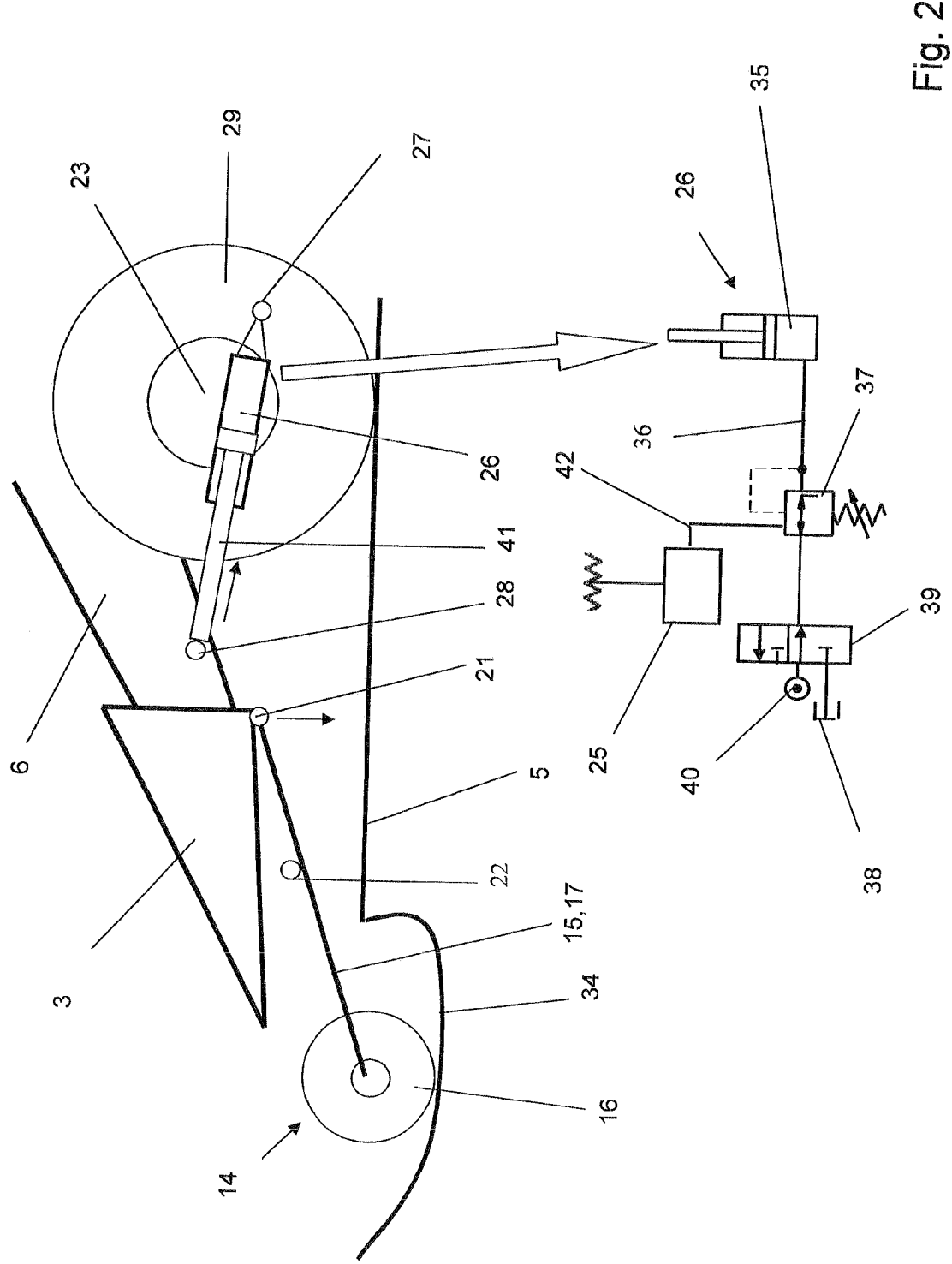
FIG. 2 shows a first schematic illustration of a front attachment that has been placed on a carriage that is traveling over a dip in the ground, the illustration also showing the automatic ground pressure control device according to the present invention

FIG. 2 shows a schematic illustration of a front attachment 3 installed on a feeder housing 6 of a harvesting machine (not depicted); front attachment 3 is connected at a coupling point 21 to a carriage 14 which includes a carrier wheel 16. In the variant of the embodiment shown, carriage 14 which is supported in a floating manner and is connected to front attachment 3 passes—together with its carrier wheel 14 extending ahead of it—over a dip 34 in the ground. In order to control the ground pressure of carrier wheel 14 against ground 5, a lifting cylinder is located on the side of feeder housing 6, and is situated at one end in pivot point 28 such that it may pivot with the feeder housing, and it is pivotably situated (not depicted) at the other end in the lower region of drive axle 23. The at least one lifting cylinder 26 is single-acting in design; piston-surface side 35 of lifting cylinder 26 is connected via a line 36 to at least one electronic pressure-control valve 37. The pressure in line 36 may be adjusted using pressure-control valve 37; if the selected threshold pressure value is exceeded, pressure-control valve 37 connects line 36 to tank 38, so that a portion of the energy-transferring medium may flow into tank 38. It lies within the scope of the present invention for electronic pressure-control valve 37 to be replaced with a pressure-limiting valve which disconnects lifting cylinder 26 located on feeder housing 6 as soon as the pressure in line 36 has reached the setting value. Using both embodiments, it is made possible to regulate the axle load transferred from lifting cylinder(s) 26 of feeder housing 6 to carrier wheel 16 and drive axle 23 and/or the steering axle of the harvesting machine to a fixed value. In addition, line 36 is connected via a switchable 2/2 displacement valve 39 to integrated pump 40 or tank 39. When pressure is applied to line 39, piston rod 41 is pushed out of lifting cylinder 26. Feeder housing 6 then performs a swivel motion about its pivot axis which is located on the harvesting machine and is not depicted here, into a position far from the ground. At the same time, carrier wheel 16 situated on the carriage remains on ground 5, since it had assumed a floating position. Given that lifting cylinder 26 is single-acting in design, the gravity-induced lowering of feeder housing 6 also results in the retraction of piston rod 41 of lifting cylinder. It lies within the scope of the present invention for the at least one lifting cylinder 26 assigned to feeder housing 6 to be double-acting in design. It is also feasible for a pressure accumulator which is known per se and is not depicted here to be assigned to line 36, in order to prevent impact loads from occurring. In the variant of the embodiment shown, a threshold pressure value, e.g., of 70 bar, is assigned to pressure-control valve 37 via automatic ground pressure control device 25 connected to line 42; front attachment 3 is actively lifted, e.g., when a pressure of 150 bar is applied to lifting cylinder 26. It lies within the scope of the present invention for other threshold pressure values to be selected. Given that carriage 14, in the state in which it is installed on front attachment 3, follows uneven ground contours in a floating manner, and that carrier wheel 16 therefore remains permanently in contact with ground 5, the desired axle load distribution may be held constant via the constant pressure regulation of lifting cylinder 26. When dip 34 in the ground is passed over, installed front attachment 3 and, simultaneously, the carriage in coupling point 11 fall under the force of gravity in the direction of the arrow against ground 5 until front attachment 3 rests on support point 22 once more and the selected pressure value of 70 bar has been attained in line 36, thereby ensuring that the desired distribution of the load on the drive axle 23 and/or the steering axle which meets the requirements of the standard is present.

In FIG. 3, in contrast to FIG. 2, carrier wheel 16 installed on carriage 14 passes over a bump 43. The position of carriage 16 swivels upward about pivot axis 44 at coupling point 11 located on front attachment 43, while carrier wheel 16 remains in contact with ground 5. At the same time, front attachment 3 which now rests on support point 22 is also lifted and swiveled upwardly about the pivot axis (not depicted) of feeder housing 6, so that carriage 14 and front attachment 3 both swivel upwardly about pivot axis 44 at common coupling point 11 in the direction indicated by the arrow; piston rod 41 of lifting cylinder 26 extends outwardly, thereby reducing the pressure in line 36. As a result of the adjustment of the threshold pressure value in pressure-control valve 37 carried out via automatic ground pressure control device 25, the pressure that exists in line 36 and, therefore, in lifting cylinder 26 is controlled constantly to 70 bar, and the ground pressure is controlled constantly, thereby ensuring that the desired distribution of the load of front attachment 3—to be transported—on drive axle 23 and/or the steering axle remains constant, even when a bump 43 is passed over.

It is within the scope of the ability of one skilled in the technical art to modify the exemplary embodiment described in a manner not presented, in order to achieve the effects described, without leaving the framework of the present invention.

It will be understood that each of the elements described above, or two or more together, may also find a useful application in other types of constructions differing from the types described above.

While the invention has been illustrated and described as embodied in a agricultural harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A self-propelled agricultural harvesting machine, comprising
an agricultural front attachment which is positioned in front of the machine with respect to forward motion and supported via at least one carrier wheel which is in contact with a ground;
a height-adjustable feeder housing for adjusting said agricultural front attachment;
at least one lifting cylinder provided for height-adjustment of said feeder housing and configured so that a ground pressure of said at least one carrier wheel is controlled via application and release of pressure from said at least one lifting cylinder; and
a control device controlling the ground pressure of said at least one carrier wheel on the ground that results when said front attachment assumes a non-working position and configured so that a pressure value of said lifting cylinder is controlled as a function of an axle load determined to be exerted on an axle selected from the group consisting of a drive axle, a steering axle, and both of the harvesting machine.

2. The self-propelled agricultural harvesting machine as defined in claim 1, wherein said control device is configured so that when said front attachment is in a transport position, the pressure value of said lifting cylinder is held constant.

3. The self-propelled agricultural harvesting machine as defined in claim 1, wherein said control device is configured so that the pressure value of said at least one lifting cylinder is further controlled in accordance with said front attachment that is installed.

4. The self-propelled agricultural harvesting machine as defined in claim 1, wherein a pressure control is carried out using an element selected from the group consisting of a pressure-control valve, an electronic pressure-control device, and a combination thereof.

5. The self-propelled agricultural harvesting machine as defined in claim 1, wherein ground pressure control is carried out in a manner selected from the group consisting of manually, automatically and both.

6. The self-propelled agricultural harvesting machine as defined in claim 1, further comprising a display unit provided for displaying a selected pressure value and an actual pressure value.

7. The self-propelled harvesting machine as defined in claim 1, and further comprising at least one load-sensing sensor associated with the axle selected from the group consisting of the drive axle, the steering axle, and both, and transmitting load-dependent signals to a control and evaluation unit, in which a control signal is generated that controls the pressure applied to the ground by said at least one carrier wheel mounted on said front attachment.

8. The self-propelled agricultural harvesting machine as defined in claim 1, further comprising means for emitting a message selected from the group consisting of an acoustic warning message, an optical warning message, and both, if a definable setpoint axle load on the axle selected from a group consisting of the drive axle, the steering axle, and both, is fallen below or exceeded.

9. The self-propelled agricultural harvesting machine as defined in claim 8, further comprising a driver's cab, and a display unit located in said driver's cab and displaying the optical warning message.

10. The self-propelled agricultural harvesting machine as defined in claim 1, further comprising a carriage which is slidable under a unit selected from one of the group consisting of said front attachment and said harvesting machine, and locked in position there, said at least one carrier wheel being mounted on said carriage.

11. The self-propelled agricultural harvesting machine as defined in claim 10, wherein said carriage includes a frame structure and said at least one carrier wheel, and is detachably attachable to said front attachment which is mounted on the harvesting machine to support said front attachment and to relieve weight from the group consisting of the drive axle, the steering axle, and both, of the harvesting machine during transport travel, said frame structure being separable from said front attachment for performing a harvesting operation.

12. A combination of a self-propelled agricultural harvesting machine, the front attachment mounted thereon, and at least one carriage which includes said at least one carrier wheel which is in contact with the ground, as defined in claim 1.

* * * * *